(12) United States Patent
Matteucci et al.

(10) Patent No.: US 7,337,664 B2
(45) Date of Patent: Mar. 4, 2008

(54) LIFTING DEVICE FOR FITTING VEHICLE WHEELS ON WHEEL BALANCERS

(75) Inventors: Marco Matteucci, Rio Saliceto (IT); Davide Ruspagggiari, Carpi (IT); Alessandro Gilocchi, Coreggio (IT)

(73) Assignee: Sicam S.R.L. (IT)

( * ) Notice: Subject to any disclaimer, the term of this patent is extended or adjusted under 35 U.S.C. 154(b) by 0 days.

(21) Appl. No.: 11/435,277

(22) Filed: May 17, 2006

(65) Prior Publication Data

US 2006/0284147 A1 Dec. 21, 2006

(30) Foreign Application Priority Data

May 18, 2005 (IT) .......................... MO2005A0121

(51) Int. Cl.
*G01M 1/02* (2006.01)
*B60C 25/132* (2006.01)

(52) U.S. Cl. ........................ 73/487; 157/1.17; 157/1.24

(58) Field of Classification Search .................. 73/460, 73/462, 468, 587, 487; 301/5.1, 5.21; 157/1.17, 157/1.24–1.28
See application file for complete search history.

(56) References Cited

U.S. PATENT DOCUMENTS 3,458,013 A * 7/1969 Haynes ....................... 187/221
5,394,959 A * 3/1995 Cullity et al. ................ 187/244
5,821,416 A * 10/1998 Hjort-Hansen ................ 73/487
5,886,258 A * 3/1999 Maioli et al. .................. 73/487
6,289,962 B1 * 9/2001 Klein .......................... 157/1.17
6,929,442 B2 * 8/2005 Ferrari et al. ................ 414/426
6,976,385 B2 * 12/2005 Okada et al. ................... 73/66

FOREIGN PATENT DOCUMENTS

DE 19741751 * 3/1999

* cited by examiner

*Primary Examiner*—Helen Kwok
(74) *Attorney, Agent, or Firm*—Hoffman, Wasson & Gitler, P.C.

(57) ABSTRACT

Lifting device for fitting vehicle wheels on wheel balancers, comprising a support platform for at least one vehicle wheel to be fitted on/removed from the substantially horizontal balancing shaft of a wheel balancer, a jack for lifting or elevating said platform, and grooves and side appendices on said platform that enable the platform to slide relative to a base in a substantially parallel direction to said balancing shaft, a first and second jaw on said platform, and an actuator for translating one jaw relative to the other jaw, so that the jaws engage opposite sides of the vehicle wheel and retain same in a vertical orientation on the support platform. The actuator is located below the support platform, and is connected to one of the jaws by a bracket which passes through a slot in the support platform.

5 Claims, 3 Drawing Sheets

LIFTING DEVICE FOR FITTING VEHICLE WHEELS ON WHEEL BALANCERS

FIELD OF INVENTION

The present invention refers to a lifting device for fitting vehicle wheels on wheel balancers.

BACKGROUND OF THE INVENTION

It is a known fact that the wheels of vehicles circulating on roads require frequent balancing, consisting in the application, onto the wheel rim, of small weights, made of lead or other material, able to offset the irregular distribution of weights on the tire.

To carry out this operation, wheel balancers are commonly used featuring a rotating shaft, a so-called "balancing shaft", onto which must be integrally positioned the wheel to be balanced, means for centering and fastening the wheel on the balancing shaft and electronic means able to read the wheel imbalance when this is turned by the balancing shaft.

The balancing shaft is arranged horizontally at a preset distance from the ground and the wheel is usually fitted on it manually by the machine operator by lifting the wheel by hand and positioning it coaxially on the balancing shaft. These manual operations are often awkward and tiring for the operator, especially when the wheel to be balanced is heavy and cumbersome.

To make the operator's job easier, the use is known of special lifting devices consisting of a moving platform both along a vertical direction and along a direction parallel with the balancing shaft.

The wheel to be balanced is rolled on top of the platform positioned close to the ground and then held tight by the operator who, with one or both hands, keeps it vertically balanced on the tread; in this position, the wheel is raised to the height of the balancing shaft and then fitted coaxially to it by means of first of all the vertical and then horizontal translation of the platform itself.

Once fitted, the wheel can be secured on the balancing shaft by means of the special centering and fastening means.

These lifting devices of traditional type are susceptible to further upgrading targeted on better operation and efficiency.

Unfortunately in fact, during platform movement, keeping the wheel in vertical position keeps at least one of the operator's hands engaged and he/she is therefore forced to perform platform movement operations in conditions that are not always easy and practical.

BRIEF SUMMARY OF THE INVENTION

The main aim of the present invention is to create a lifting device for fitting vehicle wheels on wheel balancers that permits achieving the above-mentioned upgrading by allowing the operator to position the wheel to be balanced on the balancing shaft in an easy and functional way.

As part of such technical aim, another purpose of the present invention is to achieve the previous aims with a simple structure, of relatively practical implementation, safe use and effective operation, as well as of a relatively low cost.

This aim and these purposes are all achieved by this lifting device for fitting vehicle wheels on wheel balancers, comprising a support platform for at least one vehicle wheel to be fitted on/removed from the substantially horizontal balancing shaft of a wheel balancer, lifting means of said platform and sliding means of said platform in a substantially parallel direction to said balancing shaft, characterized in that it comprises removable means of retention of said wheel on said platform in a work configuration in which the rotation axis of the wheel itself is substantially parallel to said balancing shaft.

Further characteristics and advantages of this invention will appear even more evident from the detailed description of a preferred, but not exclusive, embodiment of a lifting device for fitting vehicle wheels on wheel balancers, illustrated by way of non limiting example in the accompanying drawings, wherein:

DETAILED DESCRIPTION

Figure 1:
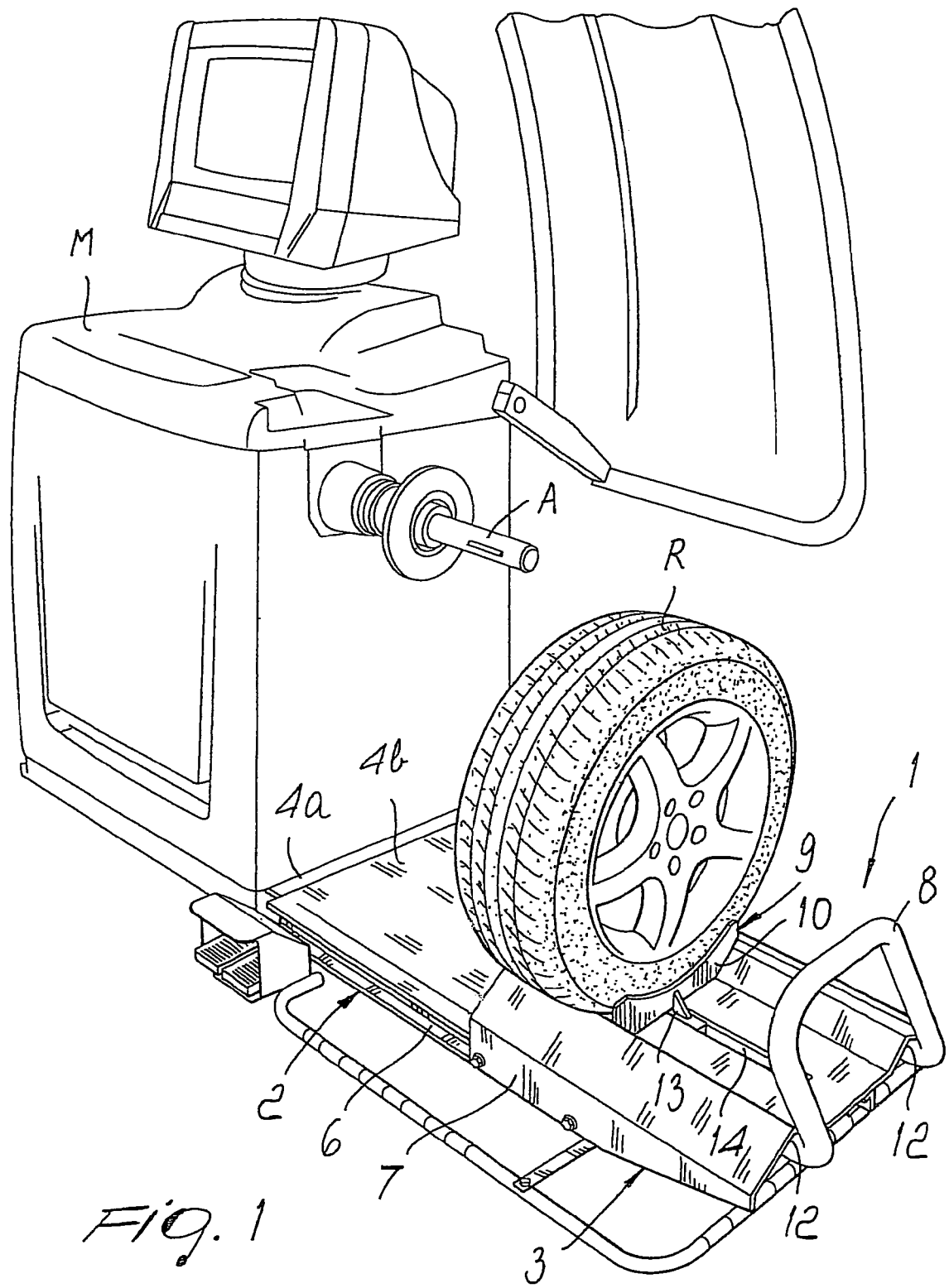
FIG. 1 is a perspective view of a wheel balancer and of the device according to the invention in lowered position.
Figure 2:
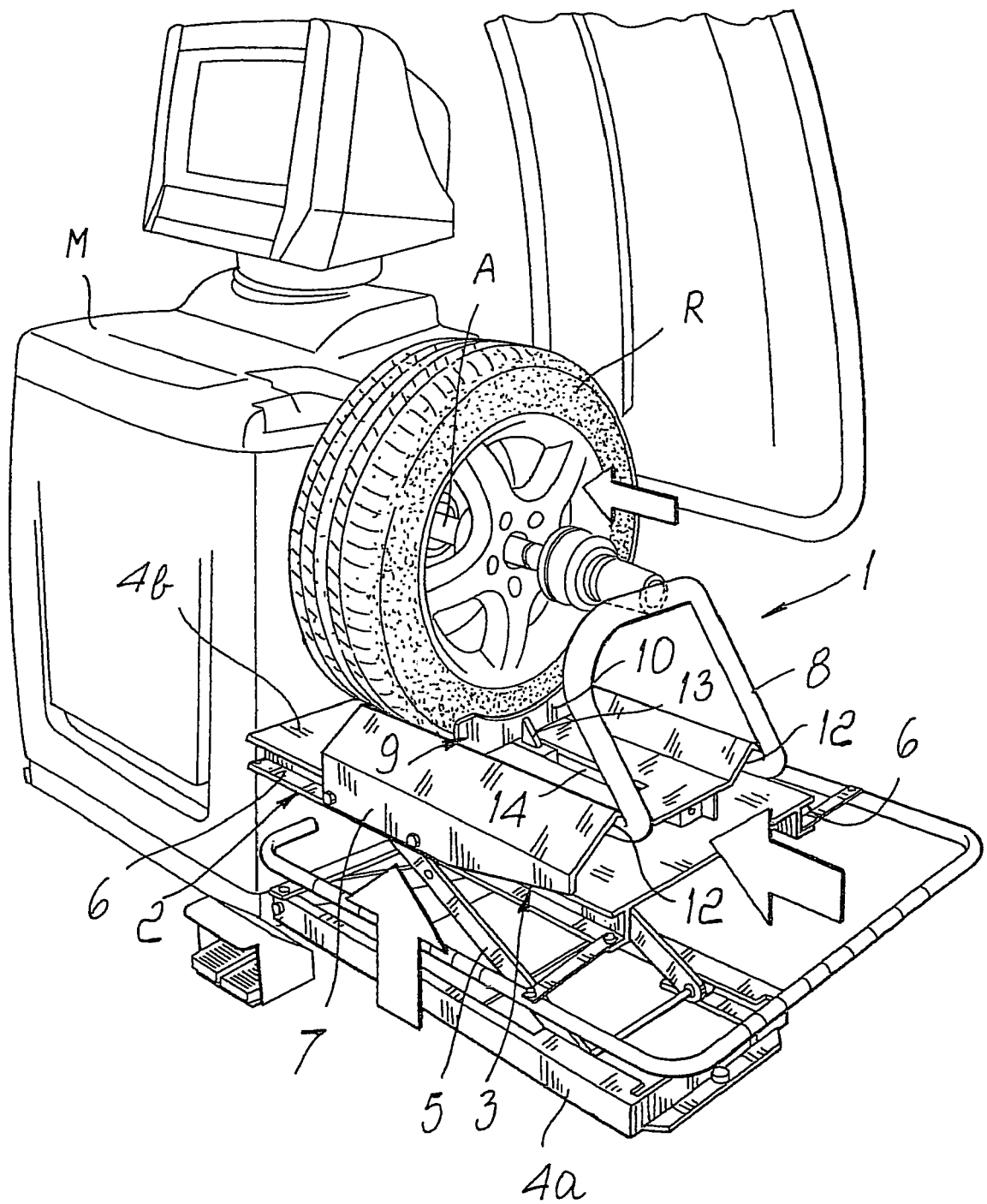
FIG. 2 is a perspective view of the wheel balancer shown in FIG. 1 and of the device according to the invention in raised position.
Figure 3:
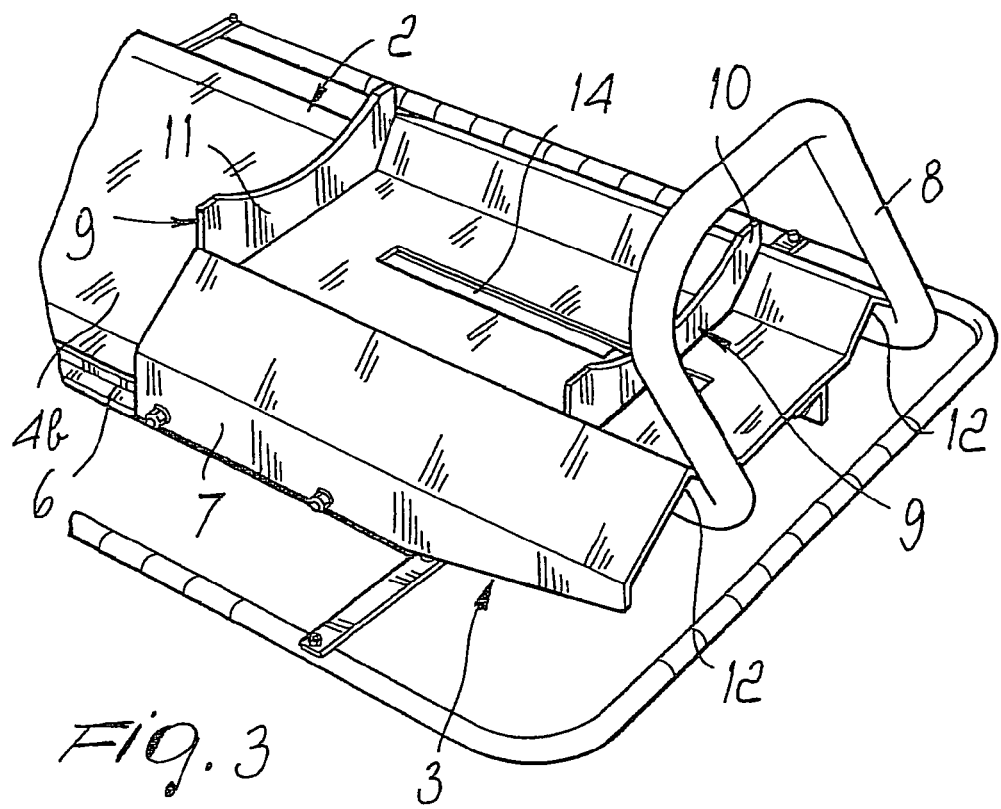
FIG. 3 is a perspective view of a part of the device according to the invention.
Figure 4:
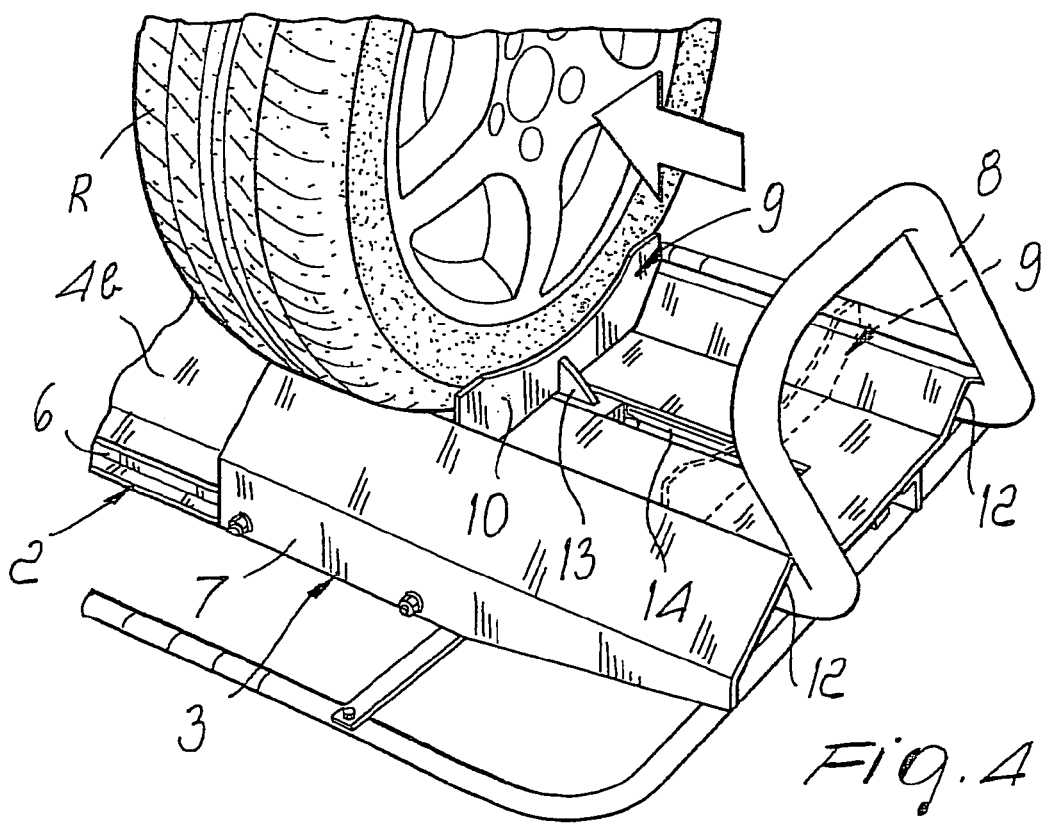
FIG. 4 is a perspective view of the device according to the invention in work configuration.

With special reference to such figures, it has been generally designated by reference numeral 1 a lifting device for fitting vehicle wheels on wheel balancers.

The device 1 comprises a substantially horizontal base 2 onto which is fitted a platform 3 being a support for a wheel R for vehicles that has to be fitted on the horizontal balancing shaft A of a wheel balancer M.

The base 2 consists of a first portion 4a, resting on the ground, and a second portion 4b, associated with the first portion 4a by interposing lifting means 5 able, during use, to allow the movement of the platform 3 from a lowered position, near to the ground, to a raised position, near the balancing shaft A.

The platform 3 is fitted on the second portion 4b of the base 2 by interposing sliding means of the platform 3 in a direction parallel to the balancing shaft A. Such sliding means consist of a pair of grooves 6 obtained in the sides of the second portion 4b and engaged longitudinally by the corresponding side appendices 7 of the platform 3.

In actual fact, the sliding means make the platform 3 free to move horizontally by means of a thrust that can be exercised by the operator on a tubular grip 8 associated at the end of the platform 3 opposite with respect to the balancing shaft A.

The platform 3 of the device 1 according to the invention features removable means of retention 9 of the wheel R in a work configuration in which the axis of rotation of the wheel itself is kept substantially parallel to the balancing shaft A. Advantageously, the removable means of retention 9 are of the vice type and comprise a first jaw 10 and a second jaw 11 associated with the platform 3. While the second jaw 11 is associated integral with the end of the platform 3 opposite the tubular grip 8, the first jaw 10 is made movable towards and away from the second jaw in a direction parallel to the balancing shaft A, so that, in work configuration, the jaws are arranged up against the opposite sides of the wheel R.

In such work configuration, in actual fact, the wheel R presents a section of tread resting on the platform 3, which, usefully, is shaped so as to present two longitudinal raised triangular sections 12, parallel with the balancing shaft A and able to act as obstacle wedges to prevent wheel R rolling on the platform 3. The removable means of retention 9 are of the automated type and comprise actuator means for the translation of the first jaw 10.

Such actuator means, not shown in detail in the illustrations, consist of a fluid-operating jack (pneumatic or hydraulic), associated below the platform 3 and connected to the first jaw 10 by the interposition of a connecting bracket 13 sliding along a through slit 14 obtained in the platform.

It has in fact been seen how the described invention achieves the desired purposes and more specifically emphasis is placed on the fact that it enables the wheel to be kept in vertical position, resting on the tread, without anyone having to intervene manually to keep it in equilibrium, thus enabling the operator to concentrate on the correct operation of the wheel balancer and/or operations relating to centering and fastening the wheel on the balancing shaft.

The invention thus conceived is susceptible of numerous modifications and variations, all of which falling within the scope of the inventive concept. Furthermore all the details can be replaced with others that are technically equivalent.

In practice, the materials used, as well as the shapes and dimensions, may be any according to requirements without because of this moving outside the protection scope of the following claims.

The invention thus conceived is susceptible of numerous modifications and variations, all of which are within the scope of the appended claims.

All the details may further be replaced with other technically equivalent ones.

In practice, the material used, as well as the shapes and the dimensions of the components, may be altered to suit different pragmatic requirements without thereby abandoning the scope of the appended claims.

The invention claimed is:

1. Lifting device for fitting vehicle wheels on wheel balancers, said device comprising:

a) a support platform for receiving at least one vertically oriented vehicle wheel to be fitted on/removed from a substantially horizontal balancing shaft of a wheel balancer, b) lifting means for moving said platform perpendicular to said horizontal balancing shaft, c) sliding means for moving said support platform in a direction substantially parallel to said balancing shaft for placing said vehicle wheel on said balancing shaft, d) retention means on said platform for retaining an axis of rotation of the wheel in a plane substantially parallel to said balancing shaft, and e) said retention means comprising at least one first jaw and one second jaw located on said platform, f) said first jaw being translatable relative to said second jaw in a direction substantially parallel to said balancing shaft to engage opposite sides of the vertically oriented vehicle wheel.

2. The lifting device as defined in claim 1 further including actuator means for translating said first jaw relative to said second jaw, said second jaw being fixed upon said platform.

3. The lifting device as defined in claim 2 wherein said actuator means is a fluid operated jack located below said support platform.

4. The lifting device as defined in claim 3 wherein a slit is formed through said support platform, and a connecting bracket is passed through said slit for a connection to said first jaw.

5. The lifting device as defined in claim 1 further comprising a base with grooves, side appendices on said platform that fit into said grooves, and a manually operable member located at an end of said platform remote from the balancing shaft for applying a thrust to said platform to move same horizontally.

* * * * *